Oct. 25, 1966     B. CARLIN     3,280,622
TIME TO VOLTAGE CONVERTER FOR PULSE-ECHO ULTRASONIC SYSTEM
Filed April 4, 1963     2 Sheets-Sheet 1

INVENTOR.
BENSON CARLIN
BY
ATTORNEY

INVENTOR.
BENSON CARLIN
BY
ATTORNEY

United States Patent Office 3,280,622
Patented Oct. 25, 1966

3,280,622
TIME TO VOLTAGE CONVERTER FOR PULSE-ECHO ULTRASONIC SYSTEM
Benson Carlin, Fairlawn, N.J., assignor, by mesne assignments, to Air-Shields, Inc., Hatboro, Pa., a corporation of Delaware
Filed Apr. 4, 1963, Ser. No. 270,764
4 Claims. (Cl. 73—67.9)

This invention relates generally to ultrasonic pulse-echo techniques for internal exploration, and more particularly to an arrangement for converting the time position of a selected echo pulse relative to the transmitted pulse into a voltage whose amplitude is proportional thereto.

Ultrasonic pulse-echo techniques represent a new approach in exploring the internal structure of living organisms. One important advantage of the ultrasonic technique is that it is nondestructive and free of the hazards incident to the use of X-ray or Gamma ray examination. Unlike X-ray, ultrasonics is also sensitive to changes in elasticity of tissue as well as changes in density.

In the ultrasonic technique, a series of very short ultrasonic pulses is projected in a narrow, straight beam in the direction to be viewed. For this purpose, a transducer is placed on the skin and coupled with a cream or fluid. Measurements are based on the amount of time for an echo to return, as well as on the amplitude and phase diffraction of the echo. Echoes are produced from biologic structures which present a different acoustic impedance to the traveling pulses. Thus, interfaces reflect not only if they are of different density, but also if they are of different elasticity. This is the basis for the high degree of differentiation that is possible among soft tissues.

In my copending application entitled "Ultrasonic Pulse-Echo Technique for Internal Exploration," Serial No. 256,769, filed February 6, 1963, there is disclosed a pulse-echo ultrasonic method combined with scanning procedures to produce patterns on a cathode ray viewing screen representative of the internal structure being scanned. Echo pulses may be displayed on an "A" type cathode-ray indicator wherein the echo pulses from different reflecting targets are represented as "pips" of varying height along the time base line on the screen. The height of each pip is indicative of the relative reflectivity of the target, whereas the displacement of the pip with respect to the point of origin of the sweep line is indicative of the distance between the target and the transducer. Echo pulses may also be displayed on a "B" type cathode-ray indicator wherein the cathode beam is intensity-modulated by returning echoes as the transducer beam is shifted across a particular area of the body, and the electron beam is deflected in synchronism therewith. In this presentation the view is similar to a cross-section taken at right angles to the direction of the ultrasonic beam.

In the "A" type of presentation, the screen may be calibrated in terms of distance, whereby the position of a "pip" along the base line gives the internal position of a reflecting organ or other internal element in the path of the exploratory beam. This technique requires the attendance of an operator to read the scale while the test is being made and it is therefore subject to human error. Moreover, where the pip represents a moving element within the body, the rate and extent of such movement cannot be interpreted with the conventional "A" type of presentation. By using a "B" type of presentation and taking a series of motion pictures of the screen, the information can be seen as a graph, but this method is cumbersome and requires photographic development.

For purposes of medical analysis, it is desirable to obtain a reading on a direct writing tape on which variations in time or distance appear in graphical form which is available for future study and interpretation. For example, in checking the functioning of the mitral valve, the condition of this valve can be correctly diagnosed if the speed with which the valve moves back and forth is known, and the rate of change of this speed is indicated. This membranous valve is located between the left auricle and the left ventricle of the heart, and can readily be located by pulse-echo ultrasonic methods. However, as pointed out above, the conventional method does not provide an output which can be recorded graphically.

Accordingly, it is the principal object of this invention to provide an arrangement for converting an echo signal whose time position indicates the location of a reflecting object, into a voltage proportional thereto, whereby changes in time position which occur with moving objects appear as variations in voltage amplitude. A significant advantage of this arrangement is that it becomes possible to record the voltage to produce a graph from which both the location of the object in terms of its distance from the transducer and the rate of change of such distance, may easily be read.

More specifically, it is an object of the invention to provide an arrangement of the above type wherein an echo pulse from an object under study may be selected from all other reflecting objects within a predetermined gating interval, the back and forth displacement of the selected echo pulse within said interval being utilized to generate a voltage whose amplitude varies accordingly.

Also an object of the invention is to provide an ultrasonic pulse-echo instrument of simple and efficient design, which directly records echoes on a moving tape to provide a permanent record thereof which may be readily diagnosed.

Briefly stated, these objects are accomplished by developing in response to each transmitted ultrasonic pulse a rectangular gating wave whose time position is so displaced from the transmitted pulse that a selected echo pulse appears within the gating interval, and initiating the generation of a triangular voltage at the instant the selected echo pulse arrives, the triangular voltage rising progressively in amplitude until a point is reached coincident with the trailing edge of the gating wave.

Thus the amplitude of the triangular voltage is maximum when the echo pulse appears at the leading edge of the gating wave, for it then rises during the full gating interval, the amplitude being smallest when the echo pulse appears at the trailing edge. For intermediate positions of the echo pulse within the gating interval, the amplitude of the sawtooth voltage attains proportionate values. Hence, where the echo pulse, with repeated occurrences, shifts in position within the gating interval, the amplitude of the triangular voltage varies accordingly to produce an output which may be graphically recorded. The amplitude of the triangular voltage is independent of that of the selected echo pulse, since the latter serves only to determine the starting time for the generation of the voltage.

For a better understanding of the invention, as well as other objects and further features thereof, reference is made to the following detailed description to be read in conjunction with the accompanying drawing, wherein.

Figure 1:
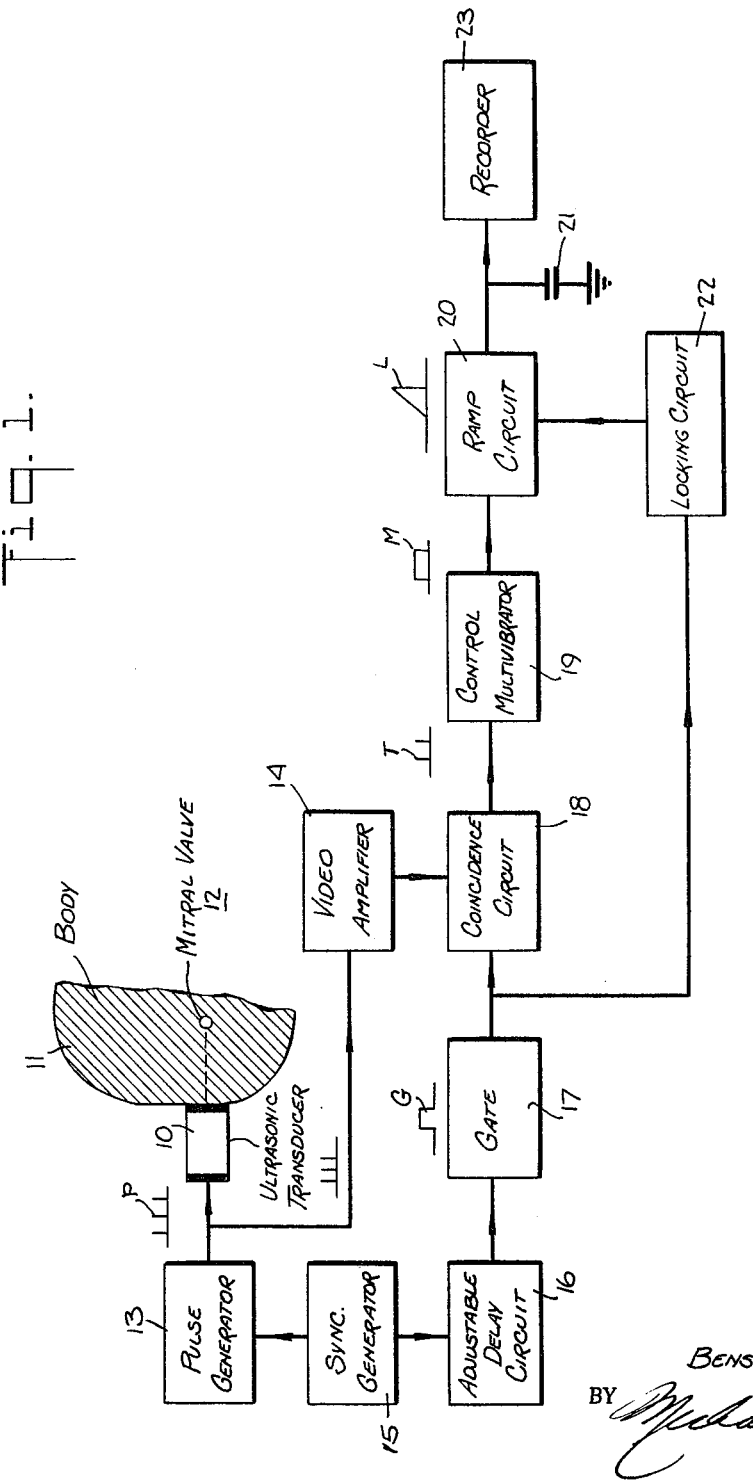
FIGURE 1 is a block diagram of a time-to-voltage converter ultrasonic pulse-echo system in accordance with the invention.

Referring now to FIG. 1, the system in accordance with the invention includes an ultrasonic transducer 10 which may take the form of barium titanate. This material behaves as an electrostrictive piezoelectric transducer adapted to convert radio-frequency energy into ultrasonic waves, or to convert ultrasonic waves into radio-frequency energy. Thus the transducer is capable of acting as an ultrasonic transmitting or detecting element. The transducer is coupled directly or by a fluid medium to a living organism 11 whose mitral valve 12 is to be examined.

The transducer 10 is excited by means of a pulse generator 13 operating at a carrier frequency in the range, for example, of 1 to 10 megacycles, to produce an exploratory beam of ultrasonic pulses P. The generator is coupled directly to the transducer. Echo pulses detected by transducer are applied to the video amplifier 14 to produce output voltage pulses whose magnitudes are in proportion to the amplitude of the echo pulses.

The pulse generator operates at a repetition rate of, say, about 500 to 1000 pulses per second, each pulse P being of micro-second duration, whereby a relatively long interval for echo pulse reception exists between successive pulses. In practice, the duration of each pulse may be in the order of five micro-seconds or even shorter, and should be made up of as few cycles of the resonant frequency as possible. In one actual embodiment, a unit was used having a pulse repetition rate of 1000 pulses per second, with a pulse duration of about two microseconds at two megacycles, the beam diameter being 1 cm.

Assuming that the transducer 10 is beamed or focused along a path towards a particular region of internal structure, the presence of reflecting targets intercepted by the beam results in echo pulses which will be picked up by the same transducer, the echo pulses returning at different points in time depending on their relative distance from the transducer.

Thus the time of arrival of the echo pulse gives an indication of the spatial position of the echo-producing target. The amplitude of the echo pulses will depend on the characteristics of the reflecting structure with respect to the pulse frequency. For example, a bone will ordinarily produce a higher degree of reflectivity than an artery or the heart wall. Similar differences will occur for other internal elements of the human body, depending in a sense on their acoustic properties, very much as objects in an auditorium have different absorption or reflection qualities with respect to sound tones.

Figure 2:
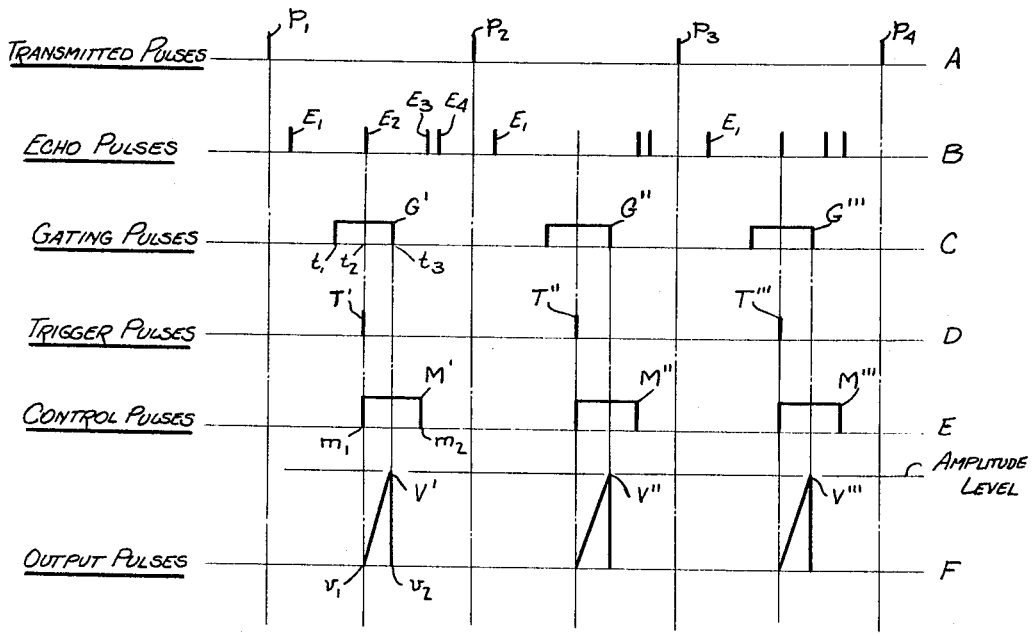
FIGURE 2 represents various pulse wave forms, identified as A–F, generated within the system.

Referring to FIG. 2, pulses P', P'', P''', etc. on line A, represent periodically transmitted ultrasonic pulses. We shall assume that echo pulses $E_1$, $E_2$, $E_3$, $E_4$ represent reflecting objects or organs in the path of the ultrasonic beam, and that echo pulse $E_2$ represents the mitral valve of interest.

In order to select pulse $E_2$ to the exclusion of all other echoes, there is provided an electronic gate 17 which may be of the vacuum-tube or diode type and acts effectively as a switch which is actuated and remains open to pass echo pulses for a limited period. The gate, for example, may be an electronic switch which is normally biased to cut-off and is rendered conductive by the application of a square wave from a one-cycle multivibrator, the width of the square wave determining the open time of the gate. The gate is opened by the application of a trigger pulse to the multivibrator, this trigger pulse being derived from a sync generator 15 through an adjustable time delay circuit 16. The operation of pulse generator 13 is also controlled by the sync generator 15.

Thus when an ultrasonic pulse is transmitted, a trigger pulse is derived simultaneously from sync generator 15, which reappears after a predetermined time interval in the output of the delay circuit 16, this pulse initiating the operation of the gate 17. In FIG. 2, the rectangular waves G', G'', etc., on base line C, represent the gating intervals with successive pulse transmissions. By varying the time delay introduced by delay circuit 16, a particular echo pulse appearing in the interval between transmitted pulses $P_1$, $P_2$, etc., may be selected for examination, and all other pulses rejected. In effect, therefore, the gate position may be shifted along the base line C relative to the point of origin representing the instant of transmission.

Assuming that echo pulse $E_2$ represents the mitral valve under examination, it will be seen that this pulse falls within the gating intervals G', G'', etc. We shall also assume for the moment that the echoes $E_2$ occur at the same time position after each transmission, whereas in fact these pulses shift as the valve moves back and forth.

The output of the video amplifier 14 which includes echoes $E_1$, $E_2$, $E_3$, etc., is applied to a coincidence circuit 18 of standard design concurrently with the output of the gate 17. This circuit produces an output pulse only when an echo pulse falls within the gating interval, which in the example shown in FIG. 2, occurs only with echo pulses $E_2$. If we regard the leading edge of the gate interval G', etc., as occurring at the instant $t_1$ and the trailing edge at $t_3$, it will be evident that the instant of coincidence is at the intermediate time value $t_2$.

Thus as shown along base line D, the coincidence circuit 18 yields trigger pulses T', T'', T''', etc., periodically at the times $t_2$. These trigger pulses are applied to a one-shot multivibrator 19 or similar means to produce square-wave control pulses M', M'', etc. (base line E) whose leading edge $m_1$ is coincident with the trigger pulses and whose trailing edge $m_2$ is later in time than the trailing edge $t_3$ of the gating interval but occurs before the next transmission of pulses P' etc. is initiated.

Coupled to the output of multivibrator 19 is a ramp circuit 20 having a charging condenser 21, the operation of the ramp circuit being initiated at the leading edge $m_1$ of the control pulses M. Condenser 21 then proceeds to charge until the ramp circuit is at cut-off. This is effected by a locking device 22 which serves to arrest charging at a point in time corresponding to the trailing edge $t_3$ of the gating interval.

In practice, the ramp circuit may include an electron control tube through which the condenser is permitted to charge when a cut-off bias voltage on the cathode thereof is lifted, the locking device 22 taking the form of a second tube which applies a bias to the cathode of the ramp control tube. The gate voltage G', etc. is applied to the locking tube to render it inoperative during the gating interval whereby the ramp circuit is in functioning condition only during the gating interval and charging commences with the trigger pulses T. Thus the triangular voltage V produced across the condenser, as shown along base line F, is initiated at a time $v_1$ corresponding to time $m_1$, and hence time $t_2$ and $E_2$, and terminates at time $v_2$ corresponding to the time $t_3$, the trailing edge of the gating interval.

The height attained by the triangular voltage V depends, of course on the charging period of condenser 21, and this charging period is equal to the interval between the selected echo pulse $E_2$ ($t_2$) which is coincident with T' and $m_1$, and the time $t_3$ of the trailing edge of the gate. The closer in time the echo pulse $E_2$ is to the leading edge ($t_1$) of the gate, the longer the charging interval and the greater the amplitude, whereas the closer in time the echo pulse is to the trailing edge ($t_3$) the shorter the charging interval and the lower the amplitude. It will be seen that the amplitude of the selected echo pulse has no effect whatever on the amplitude of the triangular voltage, for the echo pulses regardless of amplitude serve only to initiate the generation of the control pulses M which are of constant amplitude and duration.

Figure 3:
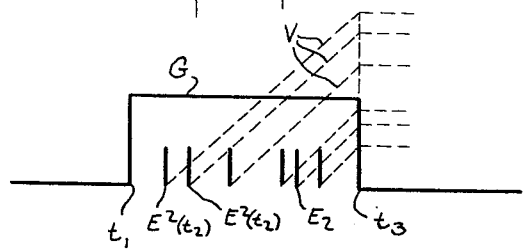
FIGURE 3 is a waveform explanatory of the amplitude variations in the triangular output voltage of the system.

If, therefore, as demonstrated in FIG. 3, the selected echo pulse is that produced by the mitral valve or any other moving body whose position shifts back and forth relative to the transducer position, the position of the echo pulse will likewise shift back and forth within the gating interval, this shift reflecting the variations in distance. This variation in distance is reflected in the amount of time it takes for a pulse to be transmitted and to return from the internal object intercepted thereby. The time or distance variations are converted by the system into proportional amplitude variations.

Figure 4:
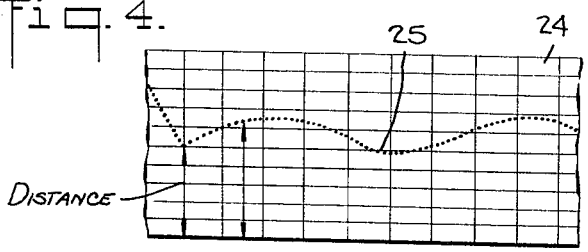
FIGURE 4 is a typical graph produced by applying the triangular output voltage to an ink recorder.

By applying the varying voltage established across condenser 21 to a moving chart ink recorder 23, a graph 25 will be drawn thereon in response to the envelope of amplitude variations. By calibrating the chart 24, as shown in FIG. 4, in terms of distance, the direction and extent of mitral valve movement may be read directly therefrom, and since the chart moves at a predetermined speed, the rate of valve change is thereby indicated.

While there has been shown a preferred form of time-to-voltage converter in accordance with the invention, it will be appreciated that many changes and modifications may be made therein without, however, departing from the essential spirit of the invention as defined in the annexed claims.

I claim:

1. In an ultrasonic system for internal exploration of a body having moving components therein, apparatus for converting the time position of a selected echo pulse into a voltage whose amplitude is a function thereof to record the movement of said components, said apparatus comprising transducer means to transmit a beam of periodic ultrasonic pulses through said body in a direction to be explored, means coupled to said transducer means for detecting echo pulses returned from components in said body which intercept said beam, means to generate in response to each transmitted pulse a rectangular gating wave whose time position is so displaced from that of the ultrasonic pulse that a selected echo pulse appears within the gating interval, means including a coincidence circuit responsive to said gating wave and said selected echo pulse to produce a trigger voltage at the instant said echo pulse appears means responsive to said trigger voltage to produce a ramp voltage whose generation is initiated at the instant the selected echo pulse arrives, the ramp voltage rising progressively in amplitude, means coupled to said gating wave means to terminate the rising ramp voltage when a point is reached coincident with the trailing edge of the gating wave, and means to record the periodically produced ramp voltages to define the waveform of component movement.

2. In an ultrasonic system for internal exploration of a body having moving components therein, apparatus for converting the time position of a selected echo pulse relative to a transmitted pulse into a voltage whose amplitude is proportional thereto, said apparatus comprising an ultrasonic transducer, a pulse generator coupled to said transducer to produce a beam of periodic ultrasonic pulses which are transmitted as a beam through said body, a gating generator to produce a gating wave, adjustable delay means, a sync generator operatively coupled to said pulse generator and said delay means to cause said delay means to yield a delay pulse a predetermined time after each ultrasonic pulse is transmitted, means applying said delay pulse to said gating generator to initiate the operation thereof, a coincidence circuit, means coupled to said transducer and said gating generator to apply said gating wave and echo pulses received from components in said body intercepting said beam to said coincidence circuit whereby said coincidence circuit yields a trigger pulse at the instant a selected pulse appears within said gating wave, a control multivibrator responsive to said trigger pulse to produce a square wave, a ramp circuit coupled to said multivibrator to produce a triangular voltage which is initiated at the leading edge of said square wave, and means coupling said ramp circuit to said gating generator to cause said triangular voltage to be terminated at the trailing edge of said gating wave.

3. Apparatus as set forth in claim 2 including means to record the periodically generated triangular voltages to graphically illustrate the movement of said components.

4. In an ultrasonic pulse-echo system for internal exploration of a body having moving components therein, apparatus for converting the time position of a selected echo pulse relative to a transmitted pulse into a voltage whose amplitude is proportional thereto, said apparatus comprising an ultrasonic transducer, a pulse generator coupled to said transducer to produce a beam of periodic ultrasonic pulses which are transmitted as a beam through said body, a gating generator to produce a gating wave, adjustable delay means, a sync generator operatively coupled to said pulse generator and said delay means to cause said delay means to yield a delay pulse a predetermined time after each ultrasonic pulse is transmitted, means applying said delay pulse to said gating generator to initiate the operation thereof whereby the leading edge of the gating wave is coincident with said delay pulse, a coincidence circuit, means coupled to said transducer and said gating generator to apply said gating wave and echo pulses received from components in said body intercepting said beam to said coincidence circuit whereby said coincidence circuit yields a trigger pulse only at the instant a selected pulse appears within said gating wave, a control multivibrator responsive to said trigger pulse to produce a square wave, a ramp circuit coupled to said multivibrator to produce a triangular voltage which is initiated at the leading edge of said square wave, and means coupling said ramp circuit to said gating generator to cause said triangular voltage to be terminated at the trailing edge of said gating wave, and a recorder coupled to said ramp circuit to indicate the periodically generated triangular voltages, thereby to illustrate the movement of said components.

References Cited by the Examiner

UNITED STATES PATENTS

| 2,888,824 | 6/1959 | Henry | 73—67.9 |
| 3,169,393 | 2/1965 | Stebbins | 73—67.9 |

OTHER REFERENCES

Periodical: Acta Medica Scandinavica, vol. CLIX, fasc. II, 1957, pages 85–90, article entitled Ultrasonic Cardiogram in Mitral Stenosis, by Inge Edler and Arne Gustafson.

RICHARD C. QUEISSER, *Primary Examiner.*

JOHN P. BEAUCHAMP, *Examiner.*